(12) United States Patent
Duello

(10) Patent No.: US 6,389,999 B1
(45) Date of Patent: May 21, 2002

(54) DYNAMIC CONTROLLER OF EXCESS DOWNPRESSURE FOR SURFACE ENGAGING IMPLEMENT

(76) Inventor: Dennis Duello, 5939 27th Ave., Vinton, IA (US) 52349

( * ) Notice: Subject to any disclaimer, the term of this patent is extended or adjusted under 35 U.S.C. 154(b) by 0 days.

(21) Appl. No.: 09/682,967

(22) Filed: Nov. 2, 2001

(51) Int. Cl.7 ............................................. A01C 15/00
(52) U.S. Cl. ......................... 111/200; 111/900; 701/50; 172/4
(58) Field of Search .................... 701/50, 200, 903, 701/900, 135; 172/4, 2, 413; 111/200, 963, 900, 135

(56) References Cited

U.S. PATENT DOCUMENTS

| | | |
|---|---|---|
| 2,621,575 A | 12/1952 | Berg |
| 2,782,703 A | 2/1957 | Chambers et al. |
| 3,561,541 A | 2/1971 | Woelfel |
| 3,658,133 A | 4/1972 | Sweet et al. |
| 4,031,963 A | 6/1977 | Poggemiller et al. |
| 4,064,945 A | 12/1977 | Haney |
| 4,176,721 A | 12/1979 | Poggemiller et al. |
| 4,331,205 A | 5/1982 | Sorenson et al. |
| 4,355,688 A | 10/1982 | Hamm et al. |
| 4,385,353 A | 5/1983 | Schneider |
| 4,423,788 A | 1/1984 | Robinson, Jr. et al. |
| 4,913,070 A | 4/1990 | Morrison, Jr. |
| 5,235,922 A | 8/1993 | Deckler |
| 5,406,897 A | 4/1995 | Pingry |
| 5,524,560 A | 6/1996 | Carter |

OTHER PUBLICATIONS

Kinze—2000 Series Planters—8/96.
John Deere—MaxEmergePlus Planters—2/98.
Kinze—3000 Series Planters—7/99.

Primary Examiner—Christopher J. Novosad
(74) Attorney, Agent, or Firm—Douglas J. Stilwell (57) ABSTRACT

A surface engaging implement having a surface penetrating member, a depth regulation member, a pressure sensor, a processor, and a variable controllable downpressure source is disclosed. The pressure sensor is disposed to detect loads upon the depth regulation member and to communicate load information to the processor. Through the processor, the controllable downpressure source may dynamically alter the pressure applied through the depth control structure to cause a desired excess downpressure and prevent an undesirably large or small amount of downpressure upon the depth regulation member. In this manner, a generally desired amount of excess downpressure may be dynamically maintained to maintain the ground penetrating member at a generally desired penetration depth.

33 Claims, 6 Drawing Sheets

DYNAMIC CONTROLLER OF EXCESS DOWNPRESSURE FOR SURFACE ENGAGING IMPLEMENT

BACKGROUND OF INVENTION

The present invention relates generally to surface or ground-engaging implements and specifically to agricultural row-crop planting implements. Although this disclosure is directed primarily towards application in the setting of a row-crop planting implement, the present invention may find application in any setting wherein dynamic control of excess downpressure upon guide structures is desired. Examples include manufacturing processes wherein controlled material cutting or scoring is required across a surface that presents a variable surface profile or a surface having a spatially variable load-bearing strength or hardness.

Producers of agricultural row crops select planting space between seeds within a row in accordance with a predetermined row width and a desired plant population per acre of land. Due to high populations of plants within a given row, competition between plants for available sunlight, soil moisture, and soil nutrients often plays an important role in the growth and development of individual plants. Competition between plants, each provided equal opportunity, can produce positive results. For example, forestry engineers make use of controlled population pressure to force the tall straight growth of trees. Competition can, however, produce negative effects. For example, it is generally believed that overall production per acre of corn is compromised if equal opportunity is not provided for each competing plant. If the emergence of a seed in the row is delayed 24 hours relative to other seeds nearby, total yield for the plants in that segment of row may be measurably reduced. Also, if the emergence of a single seed is delayed 48 hours, relative to the seeds nearby, remaining yield potential may be best protected by destroying the delayed plant. Agricultural producers thus have a clear and definite interest in practices that produce or favor not only an optimum growing environment for all seeds generally, but an equal opportunity for each seed and resulting plant.

The system disclosed herein provides for the dynamic control of excess downpressure applied to a surface-engaging depth control structure that is used in combination with a surface-penetrating instrument. In the agricultural setting, this system addresses an important aspect of the producers' interest in providing an equal environment and opportunity for each plant, namely, providing uniform depth of seed placement. This new system expands the producers' opportunities to manage the effects of the several variable factors that commonly affect the depth of seed placement. A discussion of a typical planting unit that may benefit from the present invention, namely, a row crop planting unit, is provided below.

Figure 1:
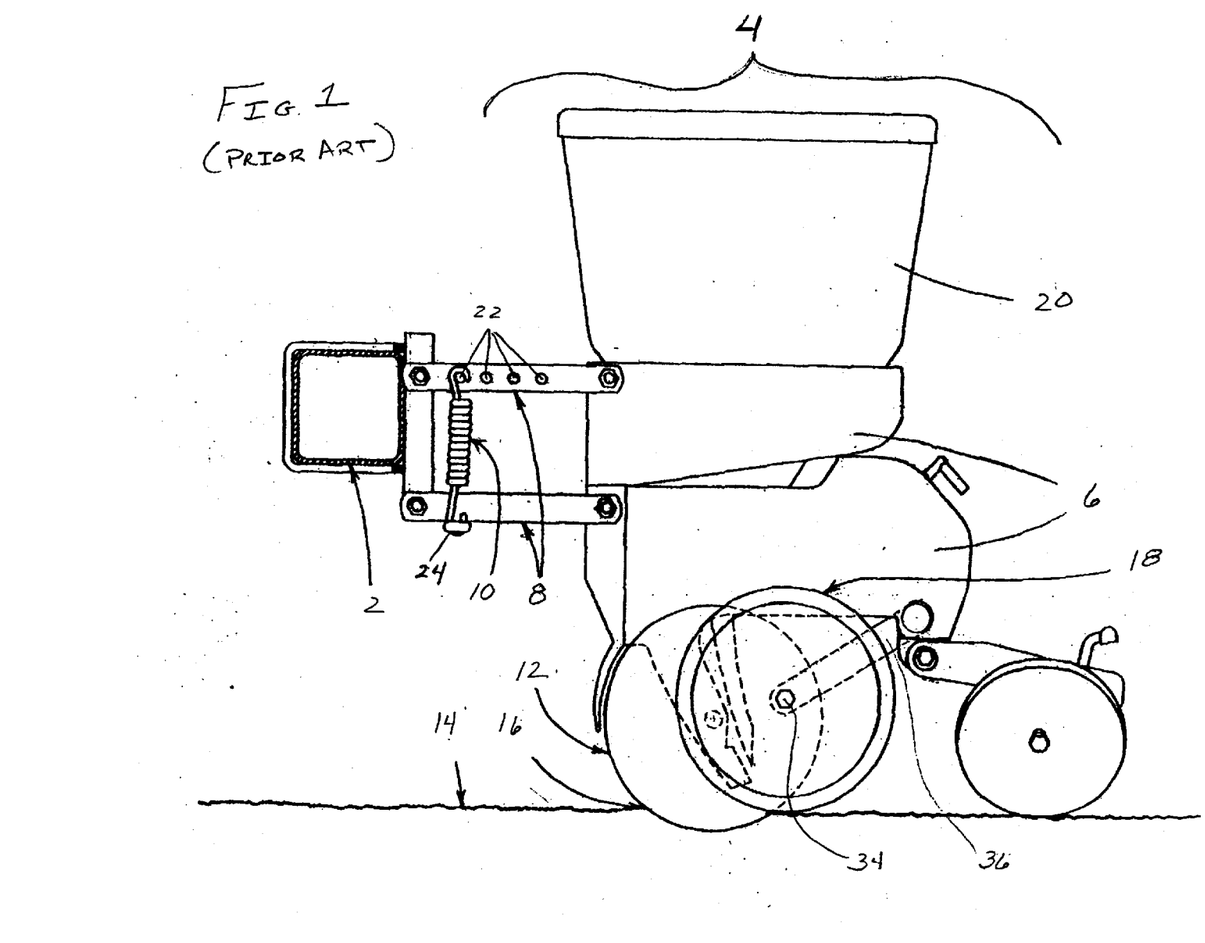
FIG. 1 (prior art) is a side elevation view of a typical row unit with disk opener having a manually adjustable spring-type supplemental downpressure means.
Figure 2:
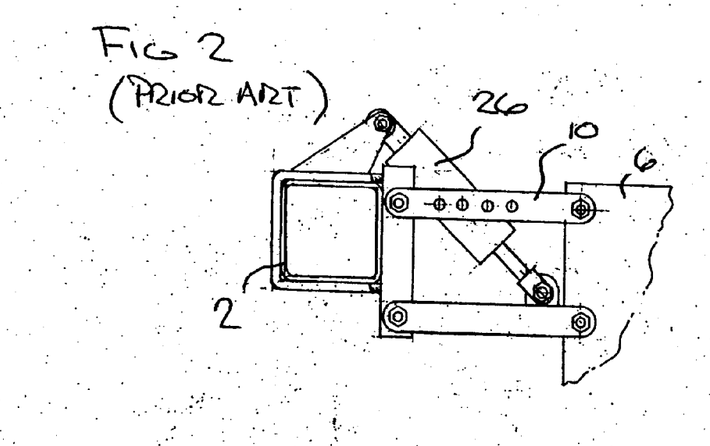
FIG. 2 (prior art) is a side elevation view of a parallelogram linkage having a top-mounted hydraulic cylinder supplemental downpressure means.
Figure 3:
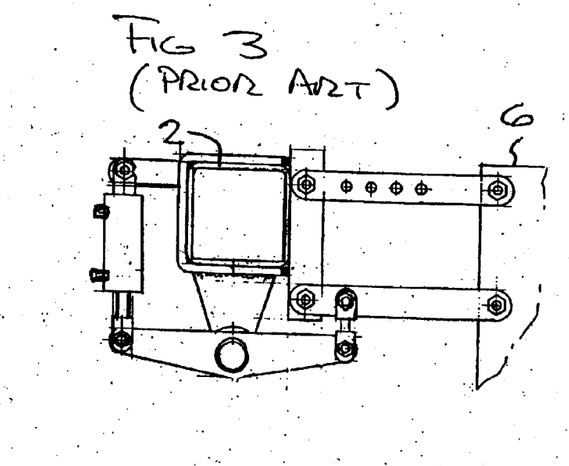
FIG. 3 (prior art) is a side elevation view of a parallelogram linkage having a front-mounted hydraulic cylinder supplemental downpressure means that may be used in combination with a plurality of row units.

FIG. 1 (prior art) illustrates a typical row crop planting unit, the basic components, relative placement, and function of which are in widespread use and commonly known. In reference to FIG. 1, a toolbar 2, is shown. The toolbar 2 is a structural element to which additional functional elements are connected. The toolbar's position is generally parallel to, and typically approximately 20 inches above, the surface of the soil 14. Of course, depending on the application, this height may vary dramatically. Typical toolbars 2 are supported by wheels and a lift system (not shown). The toolbar 2 is typically pulled forward by a tractor 50 (in the direction of the viewer's left) by means of a hitch (not shown). The primary function of the toolbar 2 is to support row unit(s) 4. Typically, a plurality of row units 4 are attached to the rear (the viewer's right) of the toolbar 2. In practice, a given toolbar 2 is used to support and pull numerous row units 4 that are positioned generally parallel to one another.

The main frame 6 of the row unit 4 is attached to the rear of the toolbar 2 by means of two pairs of parallel linkages 8, each pair being pivotal at both ends. In FIG. 1 (prior art), only the left pair of parallel linkages 8 is shown. Attached between the top and bottom portions of the parallel linkages 8 are adjustable, supplemental downpressure springs 10. The adjustable, supplemental downpressure springs 10 are typically attached at a fixed point 24 on one of the parallel linkages 8, and at one of several selectable attachment points 22 on the paired parallel linkage 8.

As the row unit 4 is drawn forward a linear, "V"-shaped opening or furrow (into which seeds may be dropped) is created in the surface of the soil 14 by what is well known in the row crop planter industry as a double disk opener 12. Other furrow forming means, for example, single disk openers or wedge-shaped implements, may also be employed to form furrows. Double disk openers 12 typically comprise a pair of rotating disks mounted in angled relationship to one another to form a driving wedge that may be moved through the soil. The left hand disk of the double disk opener 12 is shown in the side elevation view of FIG. 1. The double disk opener 12 may produce the linear "V" shaped opening or furrow in the soil surface due to the particular orientation of one rotating disk relative to the other. This relationship is generally fixed by the disks' mounting to the row unit main frame 6. The horizontal distance between the centers of the two separate disks of the double disk opener 6 is generally one to several inches. The generally intersecting axes about which each disk of the double disk opener respectively and independently rotates are typically vertically fixed in relation to the row unit main frame 6. The angled relationship between the disks (that form the wedge) typically brings the edges of the two disks into contact or closest relationship with each other at the opener disk cutting edge 16 where the disks enter and penetrate the soil surface 14. The effectiveness of the double disk opener 12 as herein generally described, is well established by its numerous applications and extensive use over several decades. In addition, such planting units often include a third, contoured, ground-breaking disk (not shown) that may be mounted to cut through and loosen the soil in front of the dual-disk wedge.

Equally well established is the use and function of adjustable gauge wheels 18 (a left one of which is shown in FIG. 1 (prior art)) mounted generally parallel to or in slightly angled relationship with, and in some applications, in side contact with, the disks of the double disk opener 12. Whereas the mounting location of the double disk opener 12 to the row unit main frame 6 is generally fixed by its manufacturer or user, the mounting location of the depth gauge wheels 18 relative to the row unit main frame 6 is generally vertically adjustable. This adjustment allows for the positioning of the lowermost point of a depth gauge wheel 18 at a distance between about zero and three inches (or other desired planting depth) above the lowermost point on an opener disk cutting edge 16. It is possible, then, by means of vertical adjustment of the gauge wheels 18 to control the depth of penetration of the double disk opener 12 into, and a selected distance beyond, the surface of the soil 14. In this manner, the gauge wheels 18 are relied on to support a portion of the weight of the row unit 4 upon the soil surface 14. A portion of the weight of the row unit generally is supported by other means such as the toolbar.

Although reference is made above to double disk openers 12 wherein disks are fixed in vertical relationship with the main frame, various suspension systems are disclosed in the prior art that relate to gauge wheel 18 and disk 12 suspensions. For example, U.S. Pat. No. 5,235,922 discloses a planter with an equalizer between gauge wheels. In the '922 patent, gauge wheels are controlled by an equalizer arm that is connected to a main frame. In FIG. 4 of the '922 patent, disks are shown in suspension with gauge wheel supports and equalizer structures. The present invention may find application with equalized or compensating suspensions such as the suspension of the '922 patent, with independent gauge wheel suspensions, or with non-equalized, non-independent suspensions.

The total vertical force necessary to cause the double disk opener 12 to penetrate the soil surface 14 to a desired uniform depth is generally referred to as "downpressure". Extreme variation in soil types, soil moisture levels, and soil compaction or looseness (due, for example, to prior tillage operations) are only a few of the various factors that provide varying resistance to the penetration of the soil surface 14 by the double disk opener 12. To date, it has generally been the planting machine operator's task to determine the desirable, necessary, and effective level of downpressure, and to manually adjust downpressure accordingly.

Primary sources of downpressure include the weight of unused seed, the weight of the row unit, and pressure from supplemental downpressure sources (springs, hydraulic cylinders, air bags, etc.). The row unit 4, attached to the toolbar 2 by means of the pairs of pivotal parallel links 8, is designed to respond vertically to the numerous large and small variations in the levelness and smoothness of the soil surface 14. Accordingly, if row units 4 were attached rigidly to the toolbar 2 and if row units 4 were forced to function without the benefit of responsive depth gauge wheels 18, variations in the levelness and smoothness of the soil surface 14 would result in dramatic soil penetration depth variations or dramatic shifts in gauge wheel loadings. Therefore, it may be seen that the first source of downpressure available to the rotating double disk openers 12 is the independently exerted, fixed weight of the row unit 4, plus any permanent attachments.

Next, the seed reservoir 20 (typically mounted at the top of the row unit 4) provides a supply of seed to be planted. The weight of this seed provides the second source of downpressure to be applied to the double disk opener 12. It is significant to note, however, that the amount of downpressure available from the seed in the seed reservoir 20 varies in proportion to the quantity of unused seed remaining in the seed reservoir 20 at a given point in time. This inherent variation in the quantity of available downpressure from this second source historically has added complexity to the seed planting machine operator's task in selecting the desirable level of downpressure necessary to produce the desired uniform seed depth.

The third source of downpressure, supplemental downpressure, may be provided by various exemplary force-assist means including springs 10, hydraulic cylinders 26, and air bags 28. These sources are referred to as supplemental downpressure sources.

The depth gauge wheels 18 preferably carry some quantity of downpressure in excess of that needed to cause the double disk opener 12 to penetrate the soil surface 14 to the full distance selected by the vertical setting of the depth gauge wheel 18. If the depth gauge wheels 18 (functioning as a depth-regulation member) carry no such excess downpressure or weight, the full preset depth of penetration of the double disk opener 12 may be compromised. In addition, some quantity of excess downpressure is often useful in crushing soil clods or compressing prior crop organic residue on the soil surface 14. If the depth gauge wheels 18 carry insufficient "excess" downpressure to crush or compress clods and organic residue in their path, the depth gauge wheels 18 would be forced to roll up and over the clod or organic residue, thereby compromising control of the uniform depth of penetration.

If the quantity of total downpressure provided by all sources at a given point in time exceeds the downpressure needed to produce the selected, preset, full depth of penetration and the crushing/compressing of clods and/or organic residue, there are two noteworthy undesirable results. First, unusable excess downpressure may cause needless and avoidable overloading of the depth gauge wheels 18 thereby shortening the useful life of the depth gauge wheels 18, and wasting the useful life of the bearings of the depth gauge wheels 18. Also, too much excess downpressure may cause the unnecessary and undesirable compaction of soil beneath the depth gauge wheels 18 or an undesirably deep seed depth, especially in loose, easily compacted soils. The negative effects of excessive soil compaction, including but not limited to decreased water and nutrient infiltration, decreased root growth, and decreased microbial activity, are well researched and documented.

There is therefore a need for an improved surface engaging device in general, and an improved ground engaging implement in particular that provides dynamic control of excess downpressure to allow operators to enjoy the beneficial aspects of having a sufficient amount of excess downpressure while minimizing the occurrences of the detrimental effects caused by having greater or less excess downpressure than is desired.

SUMMARY OF INVENTION

A dynamic, user-controllable, variable and responsive downpressure control system is provided to allow an operator to select a level of excess downpressure that, in the operator's judgment or in accordance with predetermined ground characteristics, maximizes the objectives of uniform depth of seed placement while minimizing the adverse effects associated with too great or too little downpressure. The system utilizes pressure or load sensors placed on the row unit, preferably on an axle or mounting structure associated with gauge wheels, to convey signals that indicate a detected load to a microprocessor that, in turn, may convey signals to a control device (electrical actuator, solenoid valve, etc.) to responsively and dynamically adjust the supplemental downpressure that is applied to the row unit 4 (and, therefore, to the gauge wheels 18). In this manner, an operator may select a desired excess downpressure and the system may dynamically maintain the selected excess downpressure as the planter is in motion and as non-dynamically controlled load sources (seed reservoirs having contents of variable weight and volume, etc.) vary. Further, if used in combination with a Global Positioning System (GPS) and/or field mapping system, site specific excess downpressure values may be selected as appropriate for different sites within a field and the present invention may maintain the desired excess downpressure for the sites or locations through adjustment of the supplemental downpressure responsively to detected loads and predetermined excess downpressure requirements. Finally, because such a system may be used with an operator display and input module, the operator may monitor system performance on an ongoing basis. This monitoring may include readings of electronic feedback regarding the target and applied loads that verify the ongoing and dynamic detection of variable loads as the unit is pulled over uneven surfaces.

DETAILED DESCRIPTION

Figure 9:
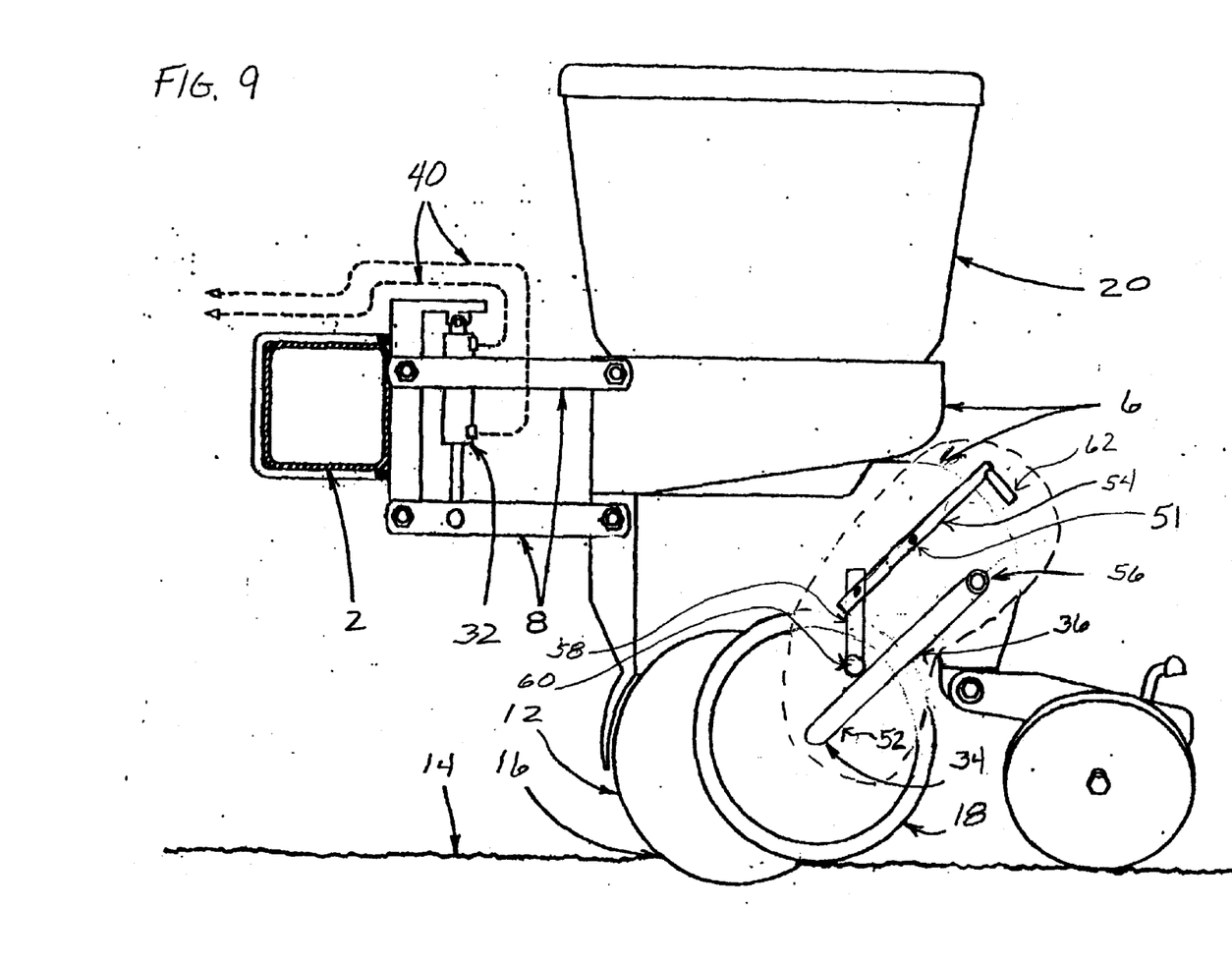
FIG. 9 (prior art) is a partially cut-away side elevation view of a disk planter row unit wherein the gauge wheel adjustment is shown.

With reference first to FIGS. 9 and 10, an end view and side view of a typical gauge wheel mounting is shown. In FIG. 9, the distance between the wheels is exaggerated and the disks 12 have been eliminated to allow viewing of a typical gauge wheel suspension. The gauge wheels 18 are set so that their lowermost, ground-engaging portions are located at a preselected distance above the lowermost portion of the disks 16 (see FIG. 1). The gauge wheel mounting structures, as illustrated in FIGS. 9 and 10, typically include support arms 36 that extended generally upwardly and back from gauge wheel axles 34 and that are pivotally combined 62 with the row unit frame 6. A gauge wheel adjuster comprising a handle 62, pivot arm 54 that may turn about a pivot point 51, and a push rod 60 allows a user to adjust the gauge wheel position relative to the main frame and thereby adjust the vertical relationship between the gauge wheels 18 and the disks 12.

Figure 7:
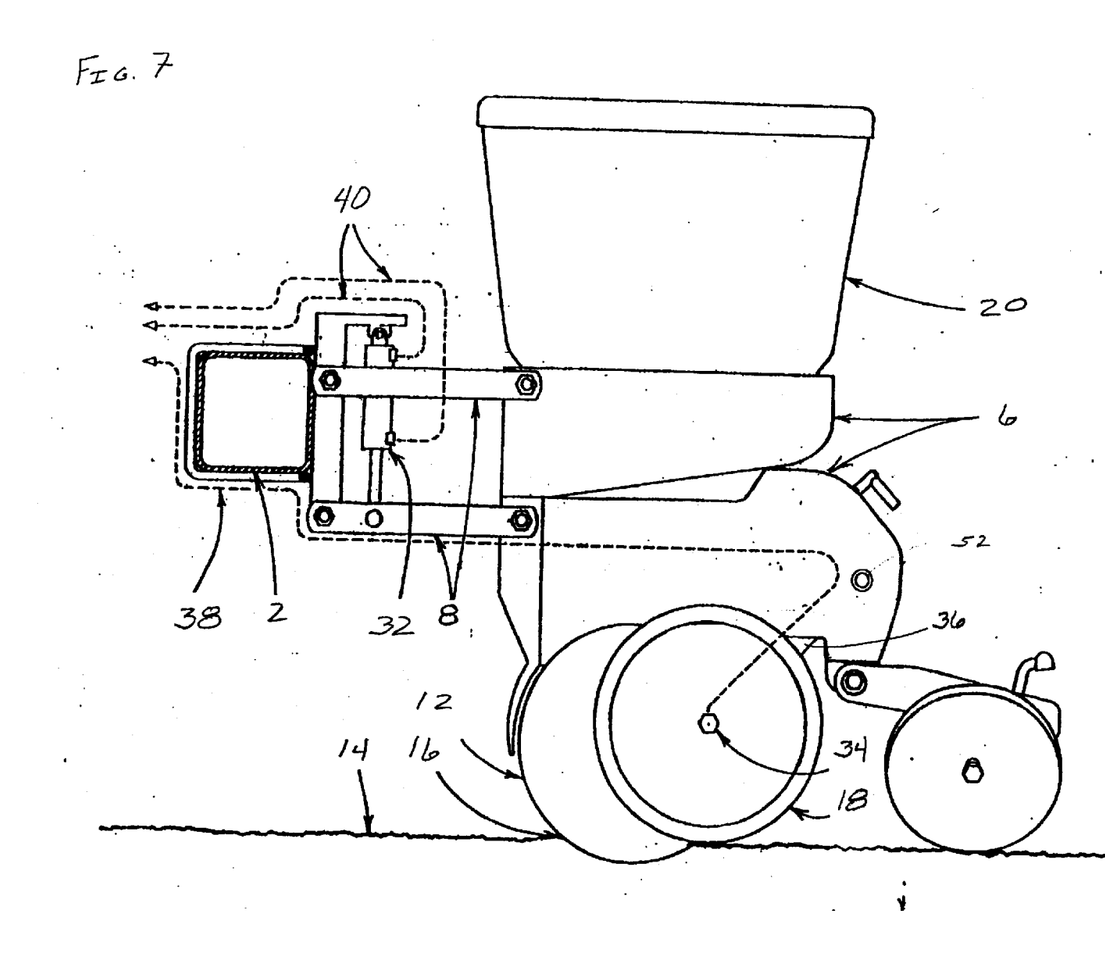
FIG. 7 is a side elevation view of a disk planter row unit of the present invention.
Figure 8:
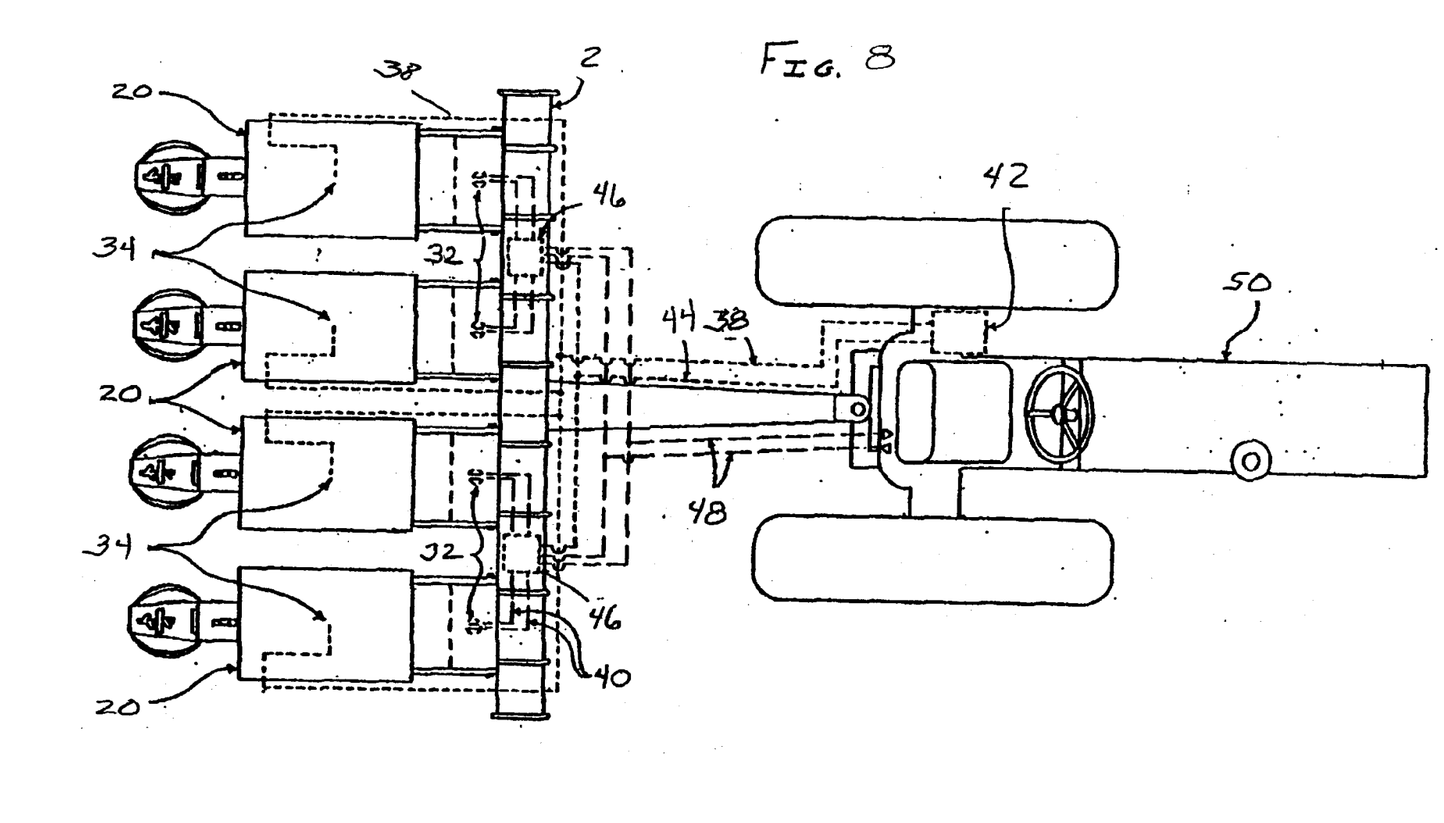
FIG. 8 is a top view of an implement of the present invention attached to a tractor and having portions thereof mounted to the tractor.

A certain amount of downward pressure, of course, is required to force the disks into ground contact. Additional pressure, or "excess downpressure", is pressure that causes the gauge wheels 18 to engage the ground and apply compressive force thereto. The gauge wheels 18 experience an upward vertical force due to the support provided by the soil surface 14. The gauge wheel mounting structures also experience a downward force that is produced by the downpressure sources as previously described (the weight of the row unit 4, seed reservoir 20, and force provided by the supplemental downpressure means—shown in FIGS. 7 and 8 as item 32). In FIG. 7, the variable supplemental downpressure means 32 is illustrated as a hydraulic drive or cylinder, but the supplemental downpressure means 32 of the present invention may be any dynamically controlled pressure source or force assist element including but not limited to electronic actuators or drives, hydraulic or pneumatic drives or cylinders, or air bags 28 in combination with a fluid or gas compression system, magnet systems, etc., or use of these systems in combination with springs or with each other.

Reference is made herein to gauge wheels, but alternative depth regulation members or means may be used. Examples include skids, plates, or track systems which, like the depth gauge wheels, present a surface engaging face. Similarly, reference is made herein to disks, but other surface penetrating members or furrow forming means such as a wedge or blade may be utilized.

A pressure sensor 52 such as a strain gauge, pressure transducer, or other device is placed on or incorporated into the gauge wheel mounting structure to detect the compressive forces exerted upon the gauge wheel mounting structure. FIG. 9 illustrates a strain gauge upon the axles 34. Pressure transducers may also serve as the pressure sensors 52. Similarly, any pressure sensing device that is capable of producing a signal to convey pressure load information may be utilized. Although placement on the axle is preferred, the pressure sensing device may be placed in any location where the vertical load on the gauge wheel may be directly or indirectly obtained.

A signal from the pressure sensor 52 is relayed via appropriate signal conveying means 38 to processor or processing means such as a microprocessor 42. Preferably, the signal that is provided by the pressure sensor 52 is an analog signal that is converted to a digital signal for use by the microprocessor 42. However, the present invention may be practiced using any convenient or desired combination of digital or analog components and/or translation devices. A processor-generated supplemental downpressure control means signal based on pressure sensor input is generated by the microprocessor and communicated by appropriate means 44 to appropriate drive control mechanisms 46 such as, for example, solenoid valves in fluid or gas systems or switches in electronic drive systems. Preferably, the present invention employs a hydraulic system including hydraulic lines 48 that may tie into the powered hydraulic system on a self-propelled machine 50 that is used to drive or tow the implement forward.

In the preferred embodiment, the gauge wheels are suspended in an equalizing or compensating arrangement as illustrated in, for example, U.S. Pat. No. 5,235,922. With such an arrangement, a pressure sensor may be mounted to detect a single load for a row unit. In this manner, the detected load variation for a row unit is an averaged value. In this manner, the effects of a clod of soil, isolated packed earth, or other obstructions that may engage only one gauge wheel 18 of a row unit 4 will not cause as great an impact on the actual detected load as would occur if the gauge wheels were not arranged in this compensating manner. The gauge wheels 18 on any given row unit 14 may also be independently suspended, thus providing two separate pressure sensor mounting points or measurement points for the detection of excess downpressure for a unit (FIG. 9).

It is preferred to provide with the microprocessor 42 a plurality of input output buffers. The user, through an input terminal device such as a keypad or touch sensitive monitor may enter a numeric value that is the desired amount of excess downpressure. Input knobs or other devices can be on the same structure as a monitor that reports the load reading to the operator. In this manner an operator may watch detected and applied load data as work progresses in an ongoing diagnostic view of the system. Given the highly variable environment in which the invention will be used, an operator should see frequent changes in detected loads and therefore understand the system to be working. Traditionally, as with a manually adjusted system, an operator would be required to cease operations, manually adjust pressure settings, and to a large extent, have faith that the downpressure systems were working. With the automation and ongoing monitoring of the present invention, the constant, minute changes in pressure readings will confirm operation for the user. Further, any number of convenient diagnostic routines may be incorporated in the system to further enhance feedback to the user. In this manner, through controlled feedback for data storage, analytical purposes, and ongoing field management decisions through "noise" feedback for verification of system operation, confidence in the dynamic control is available from the cab or from a convenient, remote location.

The input buffers may receive the excess downpressure signals' from the pressure sensors or from the pressure sensors via an A/D converter. The microprocessor compares the user's input value for a desired excess downpressure with the detected excess downpressure and determines one of three actions, namely, an increase in supplemental downpressure, a decrease, or no change. An appropriate output signal is generated based on the determined response and output to the output buffer for communication to the supplemental downpressure control means.

Preferably, a control filter routine may be selected by the user to minimize responsive load changes through the designation of a minimum load disturbance or change limit below which a responsive supplemental downpressure change will not be triggered. Further, depending on the degree of responsiveness that is desired, the processing system may be configured to filter and average load disturbance data from one or a selected group of sensors for determination of necessary responsive downpressure shifts. The filtering and averaging of load data (such as between sensors, over time for one sensor, or at selected, discrete time intervals, etc.) allows avoidance of constant, minute responses that may tax and overwork the system. In this manner, the limited moving parts of the present invention comprising the variable, supplemental downpressure source 32, will not be taxed through an excessive number of load shifts, and the useful life of the components may be extended. A similar preservation function is served through the load averaging effect created by the dual pressure measurements per row unit 4 or through equalizing or compensating gauge wheel mountings. Of course, the present invention as described herein may be applied without dual measurements on individual row units and without a minimum disturbance or change limit or load data filter if desired.

The preferred load or pressure measurement device of the present invention are preferably standard pressure sensor components. Such devices may be easily replaced and calibrated leading to an inexpensive construction for the system. Of course, non-conventional pressure sensor components that may come to exist from time to time may find application in the present invention, especially if such components are durable in the ranges of loads likely to be encountered in the setting of present surface engaging implement. The invention may be practiced using a microprocessor. As stated, it is preferred to provide a link to the vehicle cab or towing vehicle operator's area for user-control and a dynamic excess downpressure load display to allow for convenient alteration of the selected excess downpressure as the operator moves into areas where the soil type may vary. Field mapping as is known and commonly applied in combination with Global Positioning Systems (a receiver for which may be integrated into the system or disposed in communication therewith) also allows the user to pre-select a desired excess downpressure for selected regions of a field. With memory, the microprocessor may record selected data regarding operation which, with GPS and/or field mapping technology and location information may contribute to various output (maps, etc.) that may be analyzed for ongoing management decisions for that field (i.e. variations in future tillage, etc.).

Figure 4:
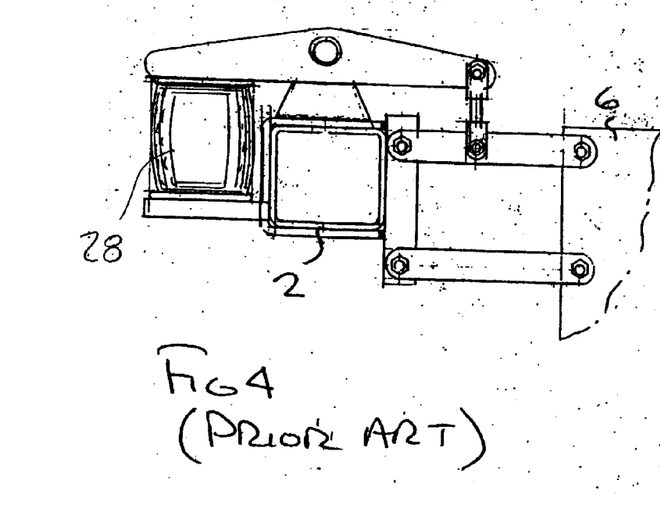
FIG. 4 (prior art) is a side elevation view of a parallelogram linkage having an air bag supplemental downpressure means that may be used in combination with a plurality of row units.
Figure 5:
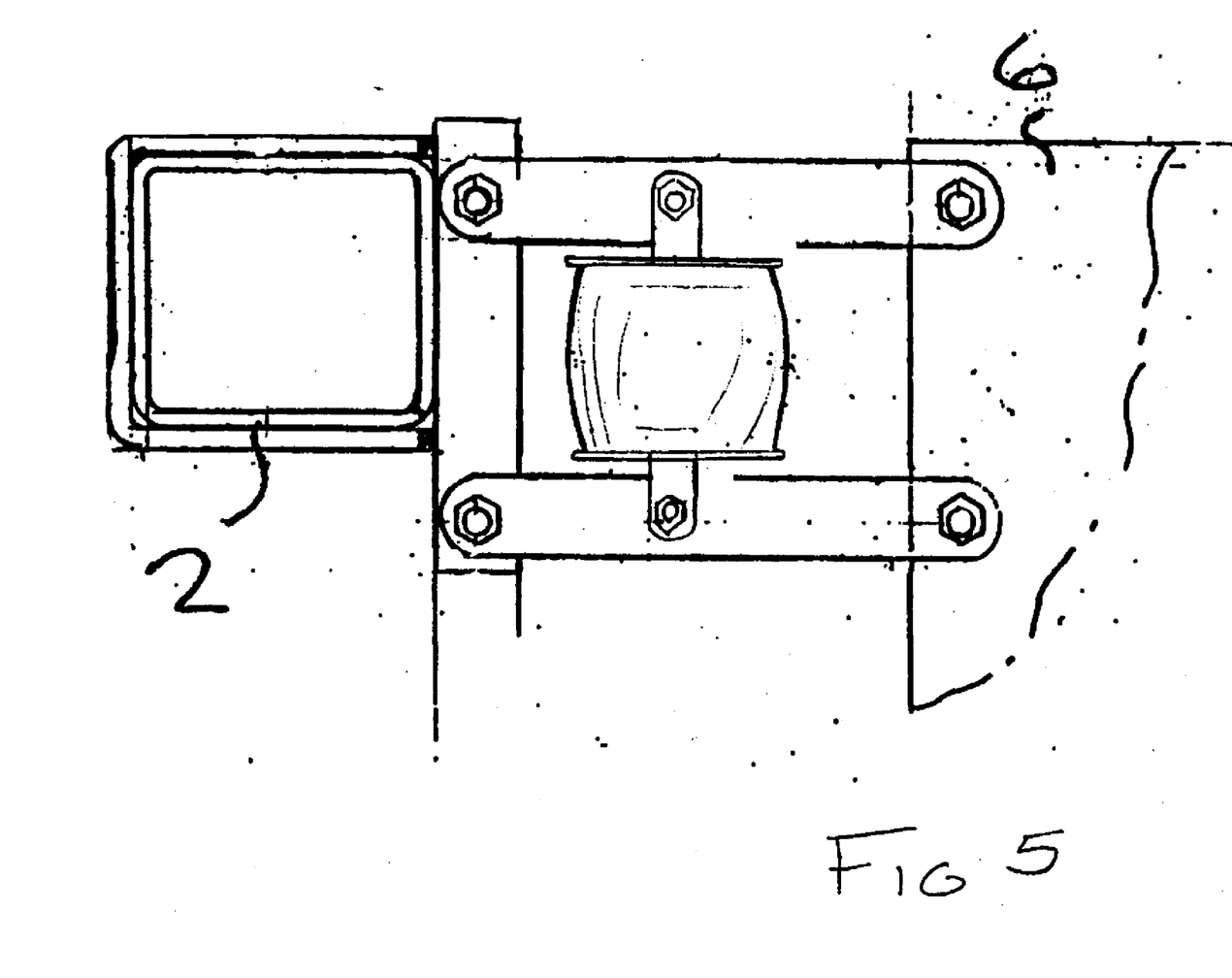
FIG. 5 (prior art) is a side elevation view of a parallelogram linkage having an air bag supplemental downpressure control means.
Figure 6:
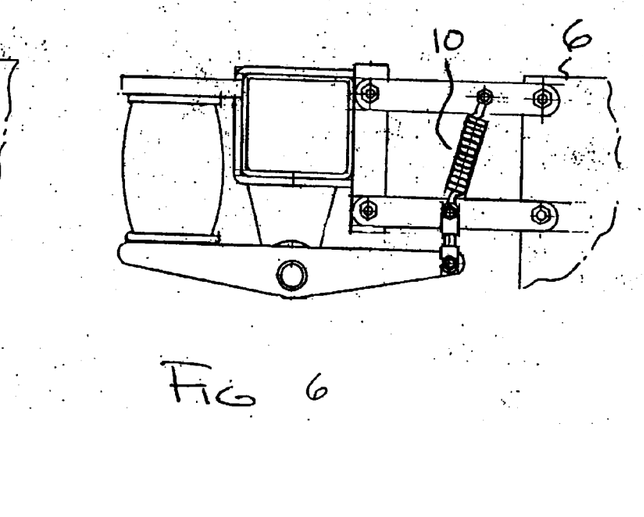
FIG. 6 is a side elevation view of a parallelogram linkage having a spring supplemental downpressure means with an air bag corrective lift means wherein the air bag corrective life means may be used in combination with a plurality of row units.

As illustrated in FIG. 6, it may be preferred to apply supplemental downpressure via a non-dynamically controlled means such as a spring 10. The air bag system of FIG. 6 is configured as a "lift means" to control a supplemental downpressure means. Such a system allows manipulation of excess downpressure through the provision of a large amount of supplemental downpressure such as through a "tight" spring in combination with the airbag that serves as a "corrective" lift means. The corrective lift means of FIG. 6 may serve as a control for the supplement downpressure means of the present invention. FIG. 4 illustrates an airbag downpressure means.

Having thus described the invention in connection with the preferred embodiments thereof, it will be evident to those skilled in the art that various revisions can be made to the preferred embodiments described herein without departing from the spirit and scope of the invention. For example, application in the proper environments may demand replacement of gauge wheels with runners or other depth regulation means, and soil conditions may make alternative furrow-forming means, such as monolithic wedges or non-disk type furrow forming extensions preferable. Further, for manufacturing settings fine instrumentation or hard surface cutting devices may be used. It is my intention, however, that all such revisions and modifications that are evident to those skilled in the art will be included within the scope of the following claims.

What is claimed is:

1. A dynamic controller of excess downpressure exerted by an implement upon a surface, said controller comprising:

a depth regulation member having a surface engaging face thereon;

a surface penetrating member combined with said depth regulation member, said surface penetrating member being disposed to extend into the surface beyond the depth regulation member surface engaging face;

a pressure sensor combined with the depth regulation member, said pressure sensor being disposed to detect a load upon the depth regulation member and said pressure sensor being adapted to transmit a detected load signal;

a processing means for receiving the detected load signal and generating a supplemental downpressure control signal based on said detected load signal;

a variable supplemental downpressure means for receiving the supplemental downpressure control signal and adjusting a supplemental downpressure applied to the depth regulation member, said variable supplemental downpressure means being combined with said depth regulation member.

2. The dynamic controller of excess downpressure of claim 1 wherein:
the depth regulation member comprises a first gauge wheel.

3. The dynamic controller of excess downpressure of claim 2 wherein:
the depth regulation member further comprises a second gauge wheel.

4. The dynamic controller of excess downpressure of claim 3 further comprising:
a frame; wherein:
the first and second gauge wheels are independently mounted to said frame.

5. The dynamic controller of excess downpressure of claim 3 further comprising:
a frame; wherein:
the first and second gauge wheels are mounted to said frame by an equalizing suspension.

6. The dynamic controller of excess downpressure of claim 1 wherein:
the surface penetrating member comprises a first disk.

7. The dynamic controller of excess downpressure of claim 6 wherein:
the surface penetrating member further comprises a second disk.

8. The dynamic controller of excess downpressure of claim 1 wherein:
the surface penetrating member comprises a wedge.

9. The dynamic controller of excess downpressure of claim 1 wherein:
the pressure sensor comprises a pressure transducer.

10. The dynamic controller of excess downpressure of claim 1 wherein:
the pressure sensor comprises a strain gauge.

11. The dynamic controller of excess downpressure of claim 1 further comprising:
a depth regulation member suspension, and wherein:
the pressure sensor is mounted on said depth regulation member suspension.

12. The dynamic controller of excess downpressure of claim 1 wherein:
the processing means comprises a microprocessor.

13. The dynamic controller of excess downpressure of claim 1 further comprising:
an input device and an output device both being communicably combined with the processing means.

14. The dynamic controller of excess downpressure of claim 13 wherein:
the processing means further provides diagnostic signals to the output device.

15. The dynamic controller of excess downpressure of claim 14 wherein:
the diagnostic signals comprise the detected load signals.

16. The dynamic controller of excess downpressure of claim 1 further comprising:
a memory communicably combined with the processing means.

17. The dynamic controller of excess downpressure of claim 1 further comprising:
a global positioning system receiver communicably combined with the processing means.

18. The dynamic controller of excess downpressure of claim 1 further comprising:
an analog/digital converter combined with the microprocessor to convert a signal between an analog and a digital format.

19. The dynamic controller of excess downpressure of claim 1 wherein:
the variable supplemental downpressure means comprises a hydraulic cylinder.

20. The dynamic controller of excess downpressure of claim 1 wherein:
the hydraulic cylinder is in fluid communication with a pressurized hydraulic system of a towing vehicle.

21. The dynamic controller of excess downpressure of claim 1 wherein:
the variable supplemental downpressure means comprises a pneumatic system.

22. The dynamic controller of excess downpressure of claim 1 wherein:
the variable supplemental downpressure means comprises an electric drive.

23. The dynamic controller of excess downpressure of claim 1 further comprising:
an attachment structure for combining the dynamic controller with a towing vehicle.

24. The dynamic controller of excess downpressure of claim 1 further comprising:
a self propelling means.

25. A ground-engaging implement comprising:
a frame;
a furrow forming means for penetrating the ground and forming a furrow therein, said furrow forming means being combined with the frame;
a depth regulation means for engaging and applying a compressive force against the ground when the furrow forming means has penetrated the ground to a selected depth, said depth regulation means being combined with the frame;
a pressure sensing means for detecting a load upon the depth regulation means and communicating a load signal, said pressure sensing means being combined with said depth regulation means;
a processing means for receiving the detected load signal and generating a supplemental downpressure response signal based on the detected load signal and a stored, target load;
a controllable and variable supplemental downpressure means for receiving the supplemental downpressure response signal and selectively generating a variable supplemental downpressure on the depth regulation means in response thereto.

26. The ground-engaging implement of claim 25 wherein:
the furrow forming means comprises a pair of disks held in angular relationship to one another, said disks being rotatably combined in fixed relationship with the frame.

27. The ground-engaging implement of claim 25 further comprising:
a tool bar and a parallel linkage, said parallel linkage pivotally combining said tool bar and said frame and said parallel linkage comprising a first and second linkage member; wherein:
the controllable and variable supplemental downpressure means selectively generates a variable supplemental downpressure on the depth regulation means by forcing a shift in the position of the parallel linkage members.

28. The ground-engaging implement of claim 25 wherein:

the controllable and variable supplemental downpressure means comprises a force assist element having at least two anchoring means thereon, the first of said at least two anchoring means being connected to said frame and the second of said at least two anchoring means being connected to a member exterior to said frame;

said force assist element being selectively adjustable to alter the relative positions of said at least two anchoring means.

29. An implement comprising:

a toolbar;

a parallel linkage comprising a first and a second parallel linkage member, each of said parallel linkage members having a first end and a second end, said parallel linkage member first ends being pivotally combined with said toolbar and said parallel linkage member second ends extending generally rearwardly from said toolbar;

a row unit main frame being pivotally combined with the parallel linkage member second ends;

a product bin combined with said main frame, said product bin being adapted to hold and selectively release product;

a double disk furrow opener combined with said row unit main frame, said double disk furrow opener comprising a first and a second rotatable disk, said disks being disposed in angled relationship to one another to cut a generally v-shaped pattern when pulled through a section of earth;

a pair of gauge wheels being disposed generally above and exterior to said double disk furrow opener, said gauge wheels being combined with the row unit main frame and being vertically adjustable relative to the double disk furrow opener;

a pressure sensor combined with at least one of said gauge wheels, said pressure sensor being disposed to sense loads upon at least one of said gauge wheels;

a processor communicably combined with the pressure sensor;

an adjustable supplemental downpressure means communicably combined with the processor, said adjustable supplemental downpressure means being adapted to apply a varying downpressure at least indirectly to said gauge wheels.

30. The implement of claim 29 further comprising:

a plurality of row units; wherein:

the adjustable supplemental downpressure means is disposed to apply a supplemental downpressure to said plurality of row units.

31. The implement of claim 29 further comprising:

an input device and an output device, said input device being communicatively combined with said processor to allow user input of a target excess downpressure and said output device being communicatively combined with said processor to allow a user to view a substantially continuously updated excess downpressure value.

32. A method for generally maintaining a selected seed planting depth for planting seeds in the earth, said method comprising the steps of:

providing a double disk furrow opener having a vertically adjustable gauge wheel thereon that engages and applies pressure against the earth, thus bearing a pressure load;

moving said double disk furrow opener across a section of the earth;

monitoring on a substantially continuous basis during the moving of said double disk furrow opener changes in pressure load upon the gauge wheel;

providing a supplemental downpressure means for altering the pressure load upon the gauge wheel;

selectively adjusting on a substantially continuous basis during the moving of said double disk furrow opener the supplement downpressure exerted by said supplemental downpressure means.

33. The method for generally maintaining a uniform seed planting depth of claim 32 wherein:

the substantially continuous selective adjustment of the supplement downpressure comprises the step of comparing the monitored changes in the pressure load upon the gauge wheel and adjusting the supplemental downpressure exerted thereon when said changes exceed a preselected change limit.

* * * * *